UNITED STATES PATENT OFFICE.

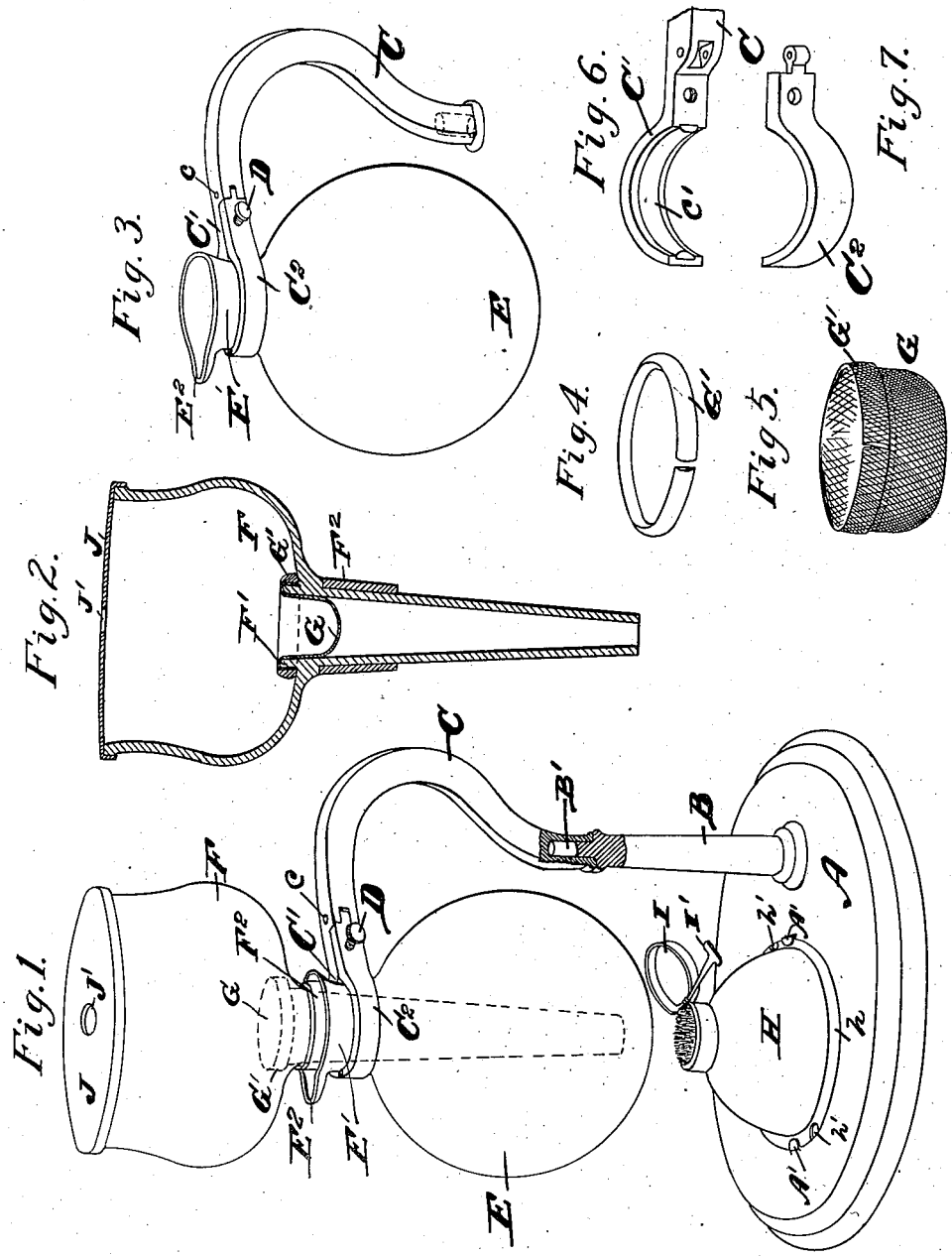

HENRY TASK, OF DETROIT, MICHIGAN, ASSIGNOR OF ONE-HALF TO JOHN LAUBE, OF DETROIT, MICHIGAN.

COFFEE-PERCOLATOR.

1,203,661.

Specification of Letters Patent. Patented Nov. 7, 1916.

Application filed June 25, 1915. Serial No. 36,164.

*To all whom it may concern:*

Be it known that I, HENRY TASK, citizen of the United States, residing at Detroit, county of Wayne, State of Michigan, have invented a certain new and useful Improvement in Coffee-Percolators, and declare the following to be a full, clear, and exact description of the same, such as will enable others skilled in the art to which it pertains to make and use the same, reference being had to the accompanying drawings, which form a part of this specification.

My invention relates to an improvement in coffee percolators shown in the accompanying drawings and more particularly set forth in the following specification and claims.

One of the objects of my invention is to provide a device simple in construction and operation, preferably formed of glass, and which may be readily cleaned.

One feature of the invention consists in providing a fluid container adapted to be suspended above a spirit lamp by a detachable supporting member, having a pivoted connection with a standard rising from the base plate of the device:—the supporting member serving as a handle for the fluid container when disconnected from the standard.

Another feature of the invention is the handle clamping member engaging the neck of the fluid container.

Another feature of the invention is the means employed for securing the spirit lamp to the base plate of the device.

Other advantages and improvements will hereafter appear.

In the drawings accompanying this specification:—Figure 1, is a perspective view of the device with a portion broken away and in section. Fig. 2, is a longitudinal vertical sectional view through the funnel. Fig. 3, is a perspective view of the fluid container for the coffee and its supporting handle. Fig. 4, is a perspective view of the strainer supporting ring. Fig. 5, is a perspective view of the strainer with the ring in place. Fig. 6, is a perspective view of one member of the supporting clamp and handle, the latter being partially broken away. Fig. 7, is a perspective view of the co-acting member of the clamp.

Referring now to the letters of reference placed upon the drawings:—A, is a suitable base formed of metal, wood or other material from which rises a standard B, having a dowel-pin B', on its upper end, adapted to enter a socket in the lower end of the handle C. The upper end of the handle C, is provided with an arcuate-shaped portion C', adapted to partially embrace the neck of the fluid coffee containing vessel.

C², is a co-acting arcuate-shaped member hinged to the member C, by a pin c, projecting through the respective members.

D, is a thumb-screw engaging the member C', adapted to clamp the neck of the container.

c', is a lining of cork or other suitable material adapted to bear upon the neck of the container.

E, is a globe-shaped container preferably formed of glass having a neck E', embraced by the members C and C',—and with a projecting lip E², for convenience in pouring the liquid.

F, is a funnel preferably formed of glass, the hollow stem of which projects down to a point relatively near the bottom of the container E.

F', is an upwardly projecting annular rim encircling the opening through the stem of the funnel.

F², is a rubber thimble surrounding the stem of the funnel directly below the bowl, to insure a tight joint between the funnel and neck of the fluid container when assembled, and to provide against breakage at this point.

G, is a strainer preferably formed of fabric secured to a divided spring ring G', adapted to embrace the annular rim F' of the funnel.

H, indicates a spirit lamp having a projecting flange h, lodged in a recess formed in the base plate A of the device. The flange h is preferably constructed with one or more notches h', to admit the ears A', formed integral with the base plate, projecting over the recessed depression provided for the reception of the lamp H.

I, is an extinguisher hinged to the neck of the lamp having a rod or handle I', for manually swinging the extinguisher on its pivot bearing;—the operation of which will be readily understood.

J, denotes a cover for the funnel F, provided with an opening J', for the escape of steam, and by means of which the cover may be easily removed.

Having indicated the several parts by reference letters the construction and operation of the device will be readily understood.

The globe E, is first secured to the handle C, by means of the clamping device D, and filled with sufficient water to supply the required number of cups of coffee. It is then suspended over the lamp and the latter lighted. The strainer G is then filled with the required quantity of coffee and placed in the neck of the funnel;—its expanding ring G', embracing the annular flange F' of the funnel to secure it against accidental dislodgment. The cover J, is placed upon the open end of the funnel and the water allowed to boil. Upon the water boiling in the globe, it will gradually ascend the neck of the funnel into its upper portion permeating the coffee therein contained. The coffee should then be stirred to prevent it from clogging the strainer, that the water may freely circulate through the mass. The device is then swung on the dowel-pin or pivot B', removing it from the action of the flame, whereupon the water within the funnel will immediately return to the globe below. The funnel being removed, the coffee is ready to serve.

Having thus described my invention what I claim is:—

1. In a device of the character described, a fluid container, means for supporting the fluid container, a funnel adapted to be supported within the container having within its bowl an upwardly projecting annular flange encircling the tubular stem of the funnel, a strainer located within the stem of the funnel, and means for securing the strainer to the annular flange of the funnel.

2. In a device of the character described, a fluid container, means for supporting the fluid container, a funnel adapted to be supported within the container having within its bowl an upstanding annular flange encircling the hollow stem of the funnel, a removable strainer located within the stem of the funnel, and an expansible ring for securing the strainer to the annular flange of the funnel.

In testimony whereof, I sign this specification in the presence of two witnesses.

HENRY TASK.

Witnesses:
SAMUEL E. THOMAS,
GRACE KYLE.